United States Patent
Lee et al.

(10) Patent No.: US 9,119,174 B2
(45) Date of Patent: Aug. 25, 2015

(54) METHOD AND DEVICE FOR USER EQUIPMENT TRANSMITTING ACK/NACK SIGNALS TO RELAY NODE IN A WIRELESS COMMUNICATION SYSTEM

(75) Inventors: Seungmin Lee, Anyang-si (KR);
Hakseong Kim, Anyang-si (KR);
Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 186 days.

(21) Appl. No.: 13/819,483

(22) PCT Filed: Aug. 23, 2011

(86) PCT No.: PCT/KR2011/006208
§ 371 (c)(1),
(2), (4) Date: Feb. 27, 2013

(87) PCT Pub. No.: WO2012/030097
PCT Pub. Date: Mar. 8, 2012

(65) Prior Publication Data
US 2013/0155942 A1 Jun. 20, 2013

Related U.S. Application Data

(60) Provisional application No. 61/380,194, filed on Sep. 3, 2010.

(51) Int. Cl.
*H04W 76/00* (2009.01)
*H04L 1/18* (2006.01)
*H04L 5/00* (2006.01)
*H04L 1/00* (2006.01)

(52) U.S. Cl.
CPC ............. *H04W 76/00* (2013.01); *H04L 1/1858* (2013.01); *H04L 1/1861* (2013.01); *H04L 5/0055* (2013.01); *H04L 2001/0097* (2013.01)

(58) Field of Classification Search
CPC ... H04L 1/1858; H04L 1/1861; H04L 5/0055; H04L 5/0053; H04L 1/1854; H04L 2001/0097; H04L 1/1812; H04L 1/1607; H04L 5/0007; H04L 7/2606; H04L 7/155; H04L 7/15542; H04W 84/047; H04W 72/0413; H04W 52/286; H04W 72/042; H04W 72/0446
USPC ........ 370/315, 328, 329; 375/260; 455/550.1, 455/422.1; 714/749
See application file for complete search history.

(56) References Cited

U.S. PATENT DOCUMENTS

2009/0097457 A1* 4/2009 Papasakellariou et al. ... 370/336
2010/0097978 A1* 4/2010 Palanki et al. ................ 370/315

(Continued)

OTHER PUBLICATIONS

PCT International Application No. PCT/KR2011/006208, Written Opinion of the International Searching Authority dated Feb. 17, 2012, 19 pages.

(Continued)

*Primary Examiner* — Bob Phunkulh
*Assistant Examiner* — Rose Clark
(74) *Attorney, Agent, or Firm* — Lee, Hong, Degerman, Kang & Waimey

(57) ABSTRACT

The present invention discloses a method for a user equipment transmitting acknowledgement/negative-ACK (AC/NACK) signals to a relay node in a wireless communication system. More particularly, the present invention comprises the following steps: setting an uplink subframe pattern including uplink blocked subframes and uplink non-blocked subframes, and selecting an ACK/NACK reception factor for each of the uplink subframes; receiving data from the relay node through at least one downlink subframe; and repeatedly transmitting ACK/NACK signals corresponding to the data, based on the uplink subframe pattern and the ACK/NACK reception factor, wherein when the uplink subframe for receiving the ACK/NACK signal is a specific uplink blocked subframe, the ACK/NACK signals are received by the non-blocked subframes allocated to the user equipment, following the specific uplink blocked subframe.

10 Claims, 19 Drawing Sheets

(56) References Cited

U.S. PATENT DOCUMENTS

2010/0331037 A1* 12/2010 Jen .............................. 455/522
2012/0176887 A1* 7/2012 Mcbeath et al. ............. 370/216

OTHER PUBLICATIONS

LG Electronics Inc., "ACK/NACK Repetition Usages in Type 1 Relay," R1-100226, TSG-RAN WG1 Meeting #59b, Jan. 2010, 3 pages.

Motorola, "Uplink ACK/NACK Repetition," R1-082474, 3GPP TSG RAN1#53-Bis, Jun. 2008, 4 pages.

LG Electronics Inc., "ACK/NACK repetition resolving Uplink ACK loss problem," R1-094484, TSG-RAN WG1 Meeting #59, Nov. 2009, 2 pages.

PCT International Application No. PCT/KR2011/006208, Written Opinion of the International Searching Authority dated Feb. 17, 2012, 9 pages.

* cited by examiner

FIG. 2
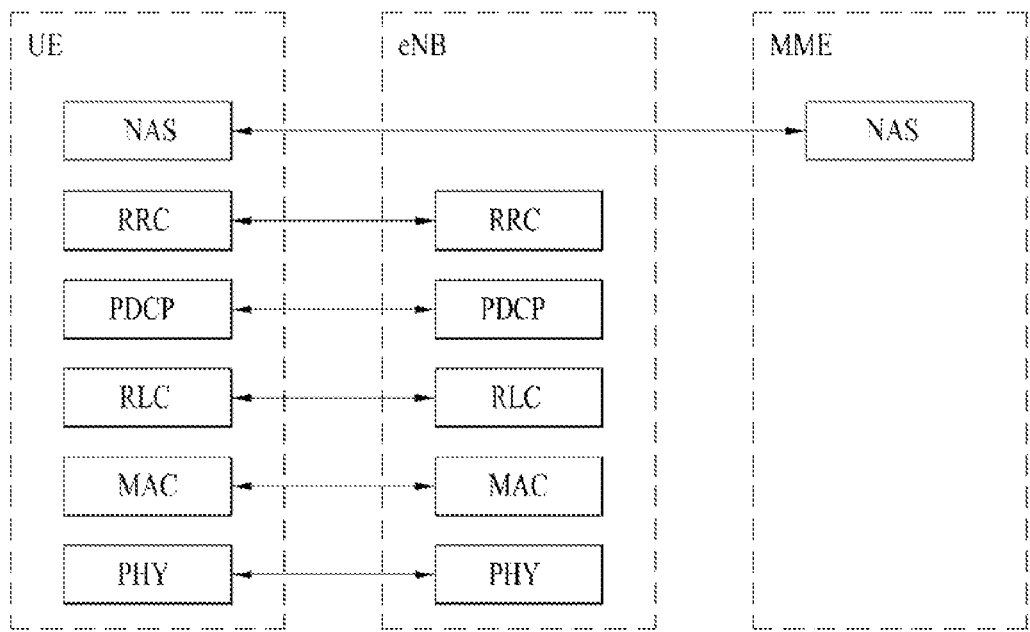
(a) Control-plane protocol stack
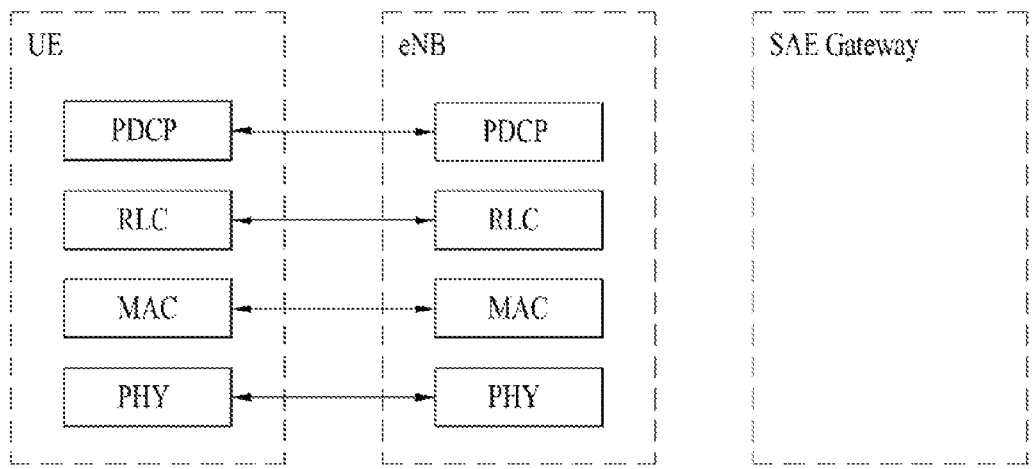
(b) User-plane protocol stack

METHOD AND DEVICE FOR USER EQUIPMENT TRANSMITTING ACK/NACK SIGNALS TO RELAY NODE IN A WIRELESS COMMUNICATION SYSTEM

CROSS-REFERENCE TO RELATED APPLICATIONS

This application is the National Stage filing under 35 U.S.C. 371 of International Application No. PCT/KR2011/006208, filed on Aug. 23, 2011, which claims the benefit of U.S. Provisional Application Ser. No. 61/380,194, filed on Sep. 3, 2010, the contents of which are all hereby incorporated by reference herein in their entirety.

TECHNICAL FIELD

The present invention relates to a wireless communication system, and more particularly, to a method for transmitting ACK/NACK (acknowledgement/non-acknowledgement) signal from a user equipment to a relay node in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of transmitting ACK/NACK signal from a user equipment to a relay node in a wireless communication system and apparatus therefor shall be proposed in the following description.

Technical Solution

To achieve these and other advantages and in accordance with the purpose of the present invention, as embodied and broadly described, a method of transmitting an ACK/NACK (acknowledgement/negative-ACK) signal, which is transmitted by a user equipment to a relay node in a wireless communication system, according to one embodiment of the present invention may include the steps of configuring an uplink subframe pattern including uplink blocked subframes and uplink non-blocked subframes and an ACK/NACK repetition factor per uplink subframe, receiving data from the relay node in at least one downlink subframe, and transmitting the ACK/NACK signal corresponding to the data repeatedly in accordance with the uplink subframe pattern and the ACK/NACK repetition factor, wherein the transmitting step comprises the step of if the uplink subframe for transmitting the ACK/NACK signal comprises the uplink blocked subframe, transmitting the ACK/NACK signal in the non-blocked subframes assigned to the user equipment behind the uplink blocked subframe.

Preferably, the transmitting step may include the step of transmitting the ACK/NACK signal multiple times corresponding to a count amounting to the ACK/NACK repetition factor. More preferably, the count amounting to the ACK/NACK repetition factor may include or exclude a transmission of the ACK/NACK signal in a specific one of the uplink blocked subframes.

Preferably, the configuring step may include the step of receiving information on the uplink subframe pattern and the ACK/NACK repetition factor from the relay node via an upper layer.

To further achieve these and other advantages and in accordance with the purpose of the present invention, as embodied and broadly described, a user equipment, which is configured to communicate with a relay node in a wireless communication system, according to another embodiment of the present invention may include a processor configuring an uplink subframe pattern including uplink blocked subframes and uplink non-blocked subframes and an ACK/NACK repetition factor per uplink subframe and a wireless communication module receiving data from the relay node in at least one downlink subframe, the wireless communication module transmitting the ACK/NACK signal corresponding to the data repeatedly in accordance with the uplink subframe pattern and the ACK/NACK repetition factor, wherein if the uplink subframe for transmitting the ACK/NACK signal comprises the uplink blocked subframe, the processor controls the ACK/NACK signal to be transmitted in the non-blocked subframes assigned to the user equipment behind the uplink blocked subframe.

Preferably, the processor may control the ACK/NACK signal to be transmitted multiple times corresponding to a count amounting to the ACK/NACK repetition factor. More preferably, the count amounting to the ACK/NACK repetition factor may include or exclude a transmission of the ACK/NACK signal in a specific one of the uplink blocked subframes.

Preferably, the wireless communication module may receive information on the uplink subframe pattern and the ACK/NACK repetition factor from the relay node via an upper layer signal.

Preferably, the uplink blocked subframe may include a backhaul uplink subframe configured for a transmission of the ACK/NACK signal to a base station from the relay node.

ADVANTAGEOUS EFFECTS

According to an embodiment of the present invention, a user equipment is able to effectively transmit ACK/NACK signal to a relay node in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of a radio interface protocol between a user equipment and E-UTRAN based on 3GPP radio access network specification.

BEST MODE FOR INVENTION

Figure 1:
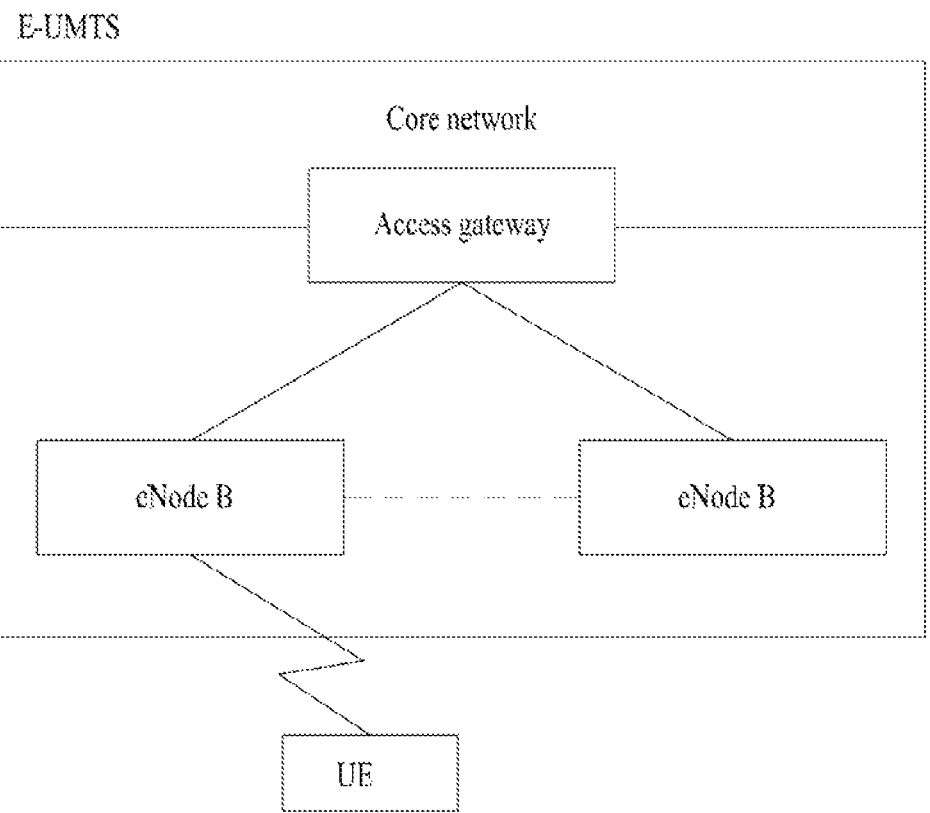
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
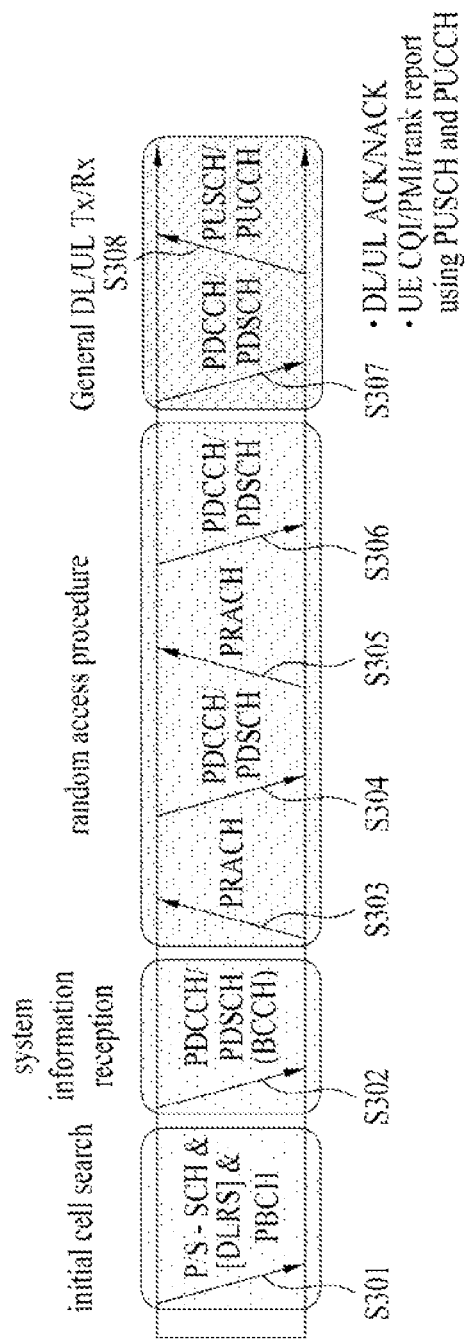
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
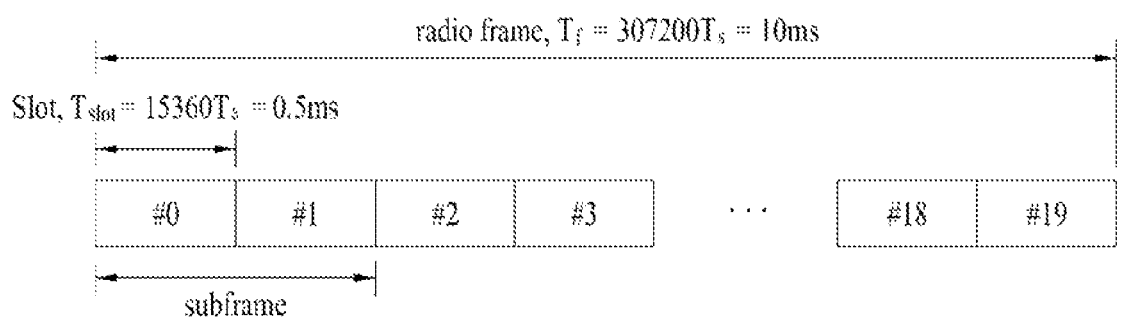
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms ($327200 \cdot T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
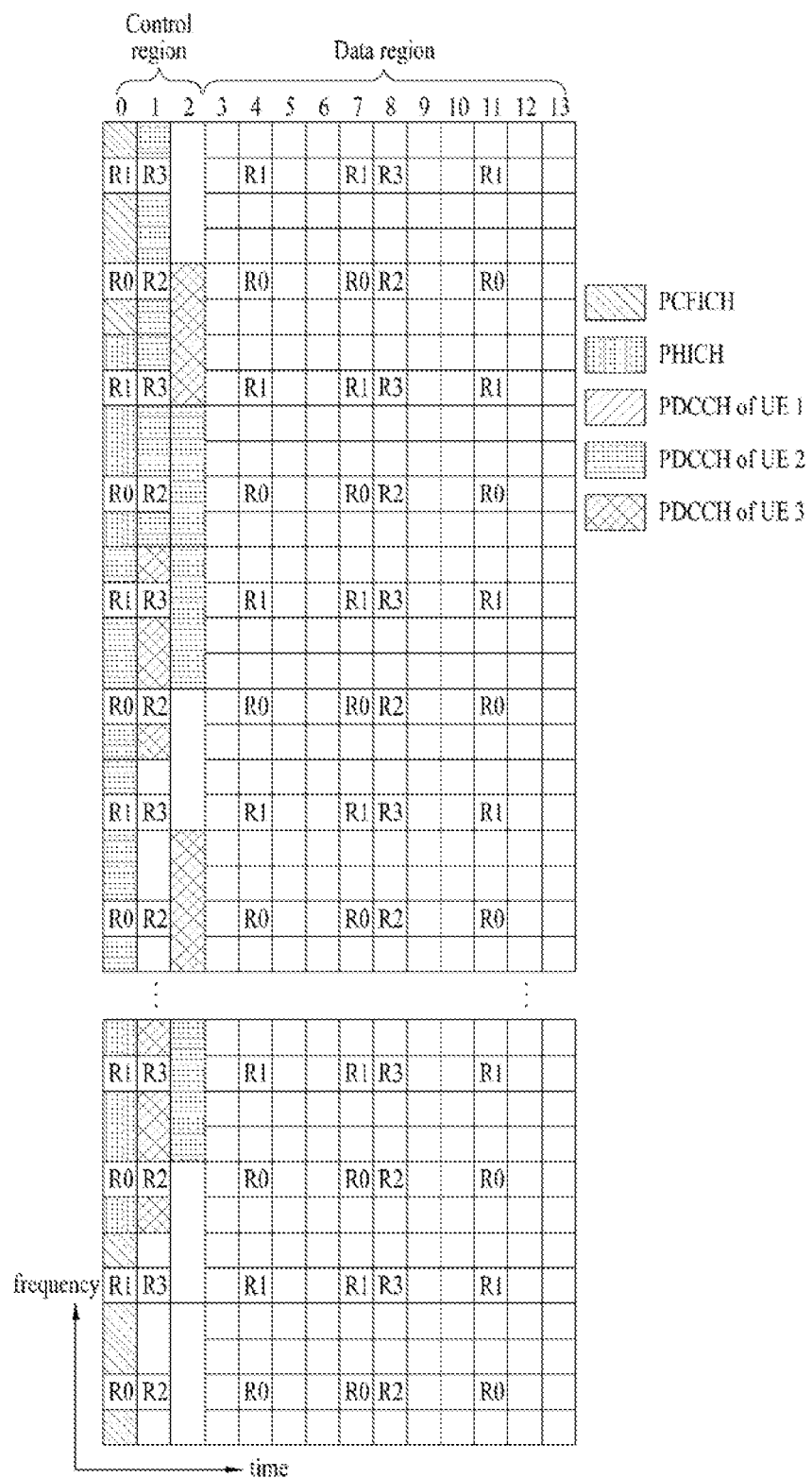
FIG. 5 is a diagram for one example of a structure of a downlink (DL) subframe used by LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R0 to R3 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
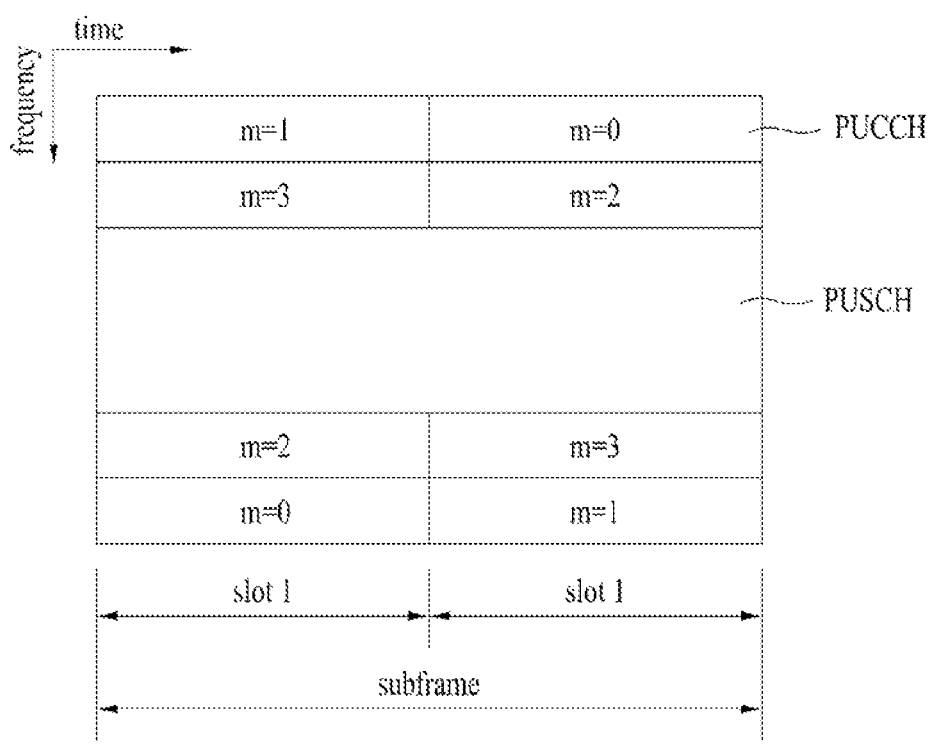
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

Meanwhile, if a channel status between a base station and a user equipment is poor, a relay node (RN) is installed between base station and the user equipment in order to provide a radio channel having a better channel status to the user equipment. In addition, a relay node is introduced to a cell edge region having a poor channel status to provide a high-speed data channel and to extend a cell service area. Thus, the relay node is being widely used to resolve the problem of the propagation shade region in a wireless communication system.

Compared to the conventional relay node having a restricted function of a repeater capable of amplifying and transmitting a signal, the latest relay node technology is being developed to cover more intelligent functions. Moreover, the relay node technology is the technology mandatory to reduce the cost requisite for establishing more base stations and the maintenance cost of a backhaul network in the next generation mobile communication system, to extend the service coverage, and to raise a data processing rate. As the relay node technology tends to be further developed, the necessity for a relay node used in the conventional wireless communication system to be supported by the new wireless communication system is rising correspondingly.

Figure 7:
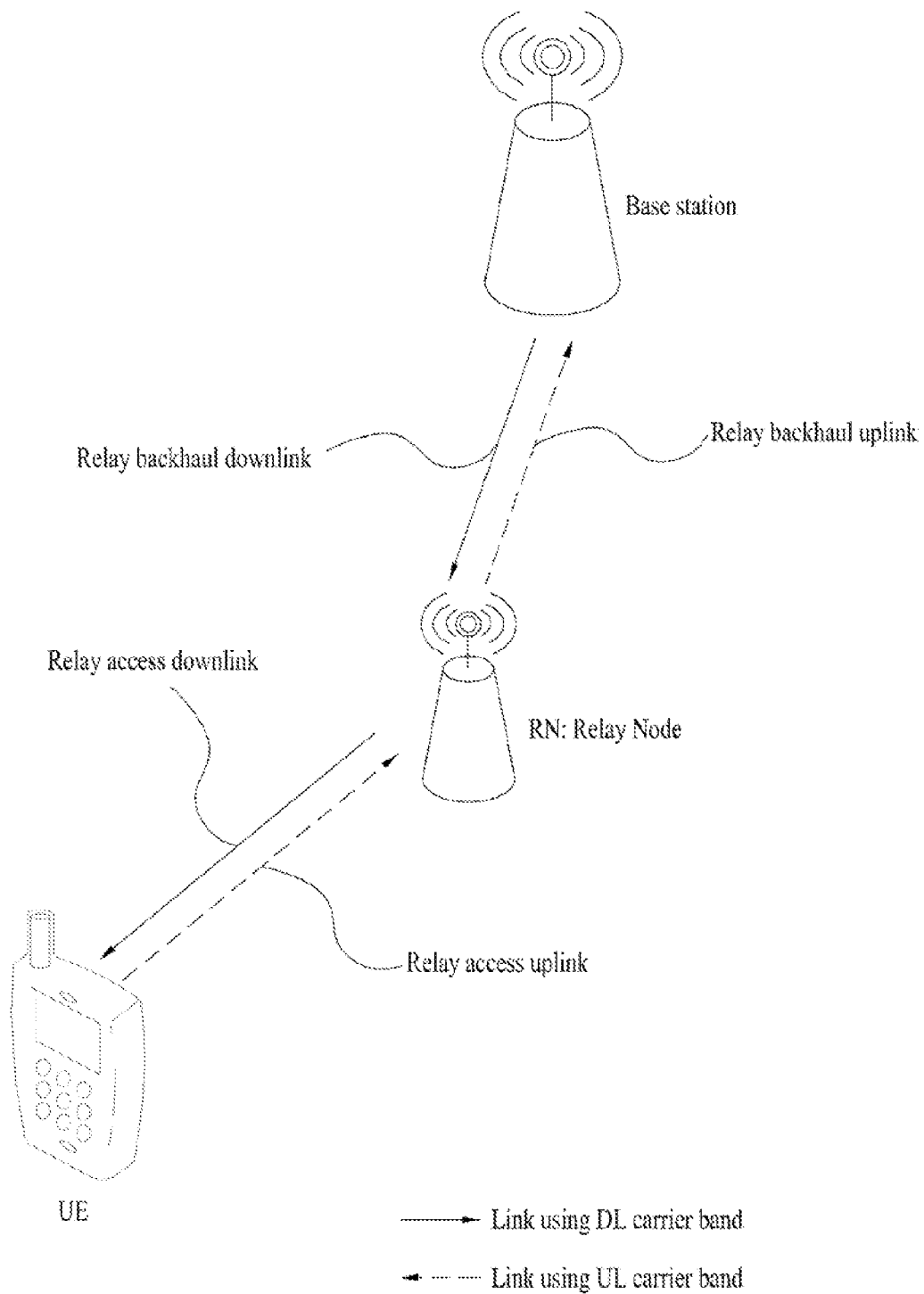
FIG. 7 is a diagram for configurations of a relay backhaul link and a relay access link in a wireless communication system.

FIG. 7 is a diagram for configurations of a relay backhaul link and a relay access link in a wireless communication system.

Referring to FIG. 7, as a relay node is introduced to play a role in forwarding a link connection between a base station and a user equipment in 3GPP LTE-A (3rd generation partnership project long term evolution-advanced) system, two kinds of links differing from each other in attributes are applied to a UL carrier frequency band and a DL carrier frequency band, respectively. A connection link part established between the base station and the relay node may be represented by being defined into a relay backhaul link. If a transmission is performed in a manner that a backhaul link uses a DL frequency band resource (e.g., the case of Frequency Division Duplex (FDD)) or a DL subframe resource (e.g., the case of Time Division Duplex (TDD)), it may be represented as a backhaul downlink. If a transmission is performed in a manner that a backhaul link uses a UL frequency band resource (e.g., the case of FDD) or a UL subframe resource (e.g., the case of TDD), it may be represented as a backhaul uplink.

On the other hand, a connection link part established between a relay node (RN) and a series of user equipments may be represented by being defined into a relay access link. If a transmission is performed in a manner that the relay access link uses a downlink frequency band resource (e.g., the case of FDD) or a downlink subframe resource (e.g., the case of TDD), it may be represented as an access downlink. If a transmission is performed in a manner that the relay access link uses an uplink frequency band resource (e.g., the case of FDD) or an uplink subframe resource (e.g., the case of TDD), it may be represented as an access uplink.

A relay node (RN) may be able to receive information from a base station in a relay backhaul downlink and may be able to transmit information to the base station in a relay backhaul uplink. In addition, the relay node may be able to transmit information to the user equipment in a relay access downlink or may be able to receive information from the user equipment in a relay access uplink.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes may be classified into one relay node configured as a part of a donor cell and another relay node capable of controlling a cell by itself Although the relay node configured as a part of the donor cell may have a relay node identifier (ID), the relay node does not have a cell identity of its own. If at least one portion of RPM (Radio Resource Management) is controlled by a base station having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relay nodes, a variety of L2 (2nd layer) relay nodes, and type-2 relay nodes may belong to the category of the above-mentioned relay node.

Regarding a relay node configured to control a cell by itself, this relay node controls one or more cells, a unique physical layer cell identity is provided to each cell controlled by the relay node, and the same RPM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 (3rd layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and may be able to transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1a relay node is operated in the out-band, and has the same features as those of the type-1 relay node. Operation of the type-1a relay node may be configured to minimize (or eliminate) the influence on L1 (1st layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, in order for a relay node to operate in in-band, prescribed resources in time-frequency space must be reserved for a backhaul link and these resources may be configured not be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDD, a backhaul downlink transmission is performed in a downlink subframe of a base station or a relay node, and a backhaul uplink transmission is performed in an uplink subframe of the base station or the relay node.

In case of an in-band relay ode, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on or under the ground).

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 8:
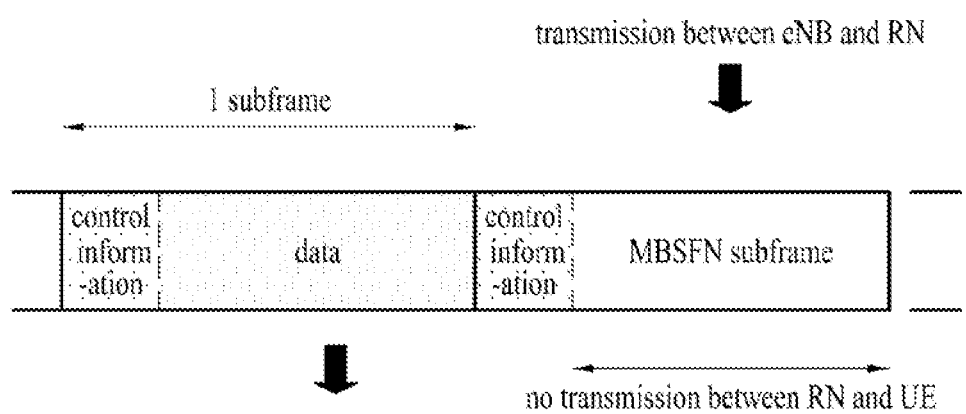
FIG. 8 is a diagram for one example of relay node resource partition.

FIG. 8 is a diagram for one example of relay node resource partitioning.

Referring to FIG. 8, in a first subframe that is a normal subframe, a downlink (i.e., an access downlink) control signal and data are transmitted from a relay node to a user equipment. In a second subframe that is an MBSFN subframe, while a control signal is transmitted from the relay node to the user equipment on a control region of a downlink subframe but any transmission from the relay node to the user equipment is not performed in the rest region of the downlink subframe. In doing so, since a legacy user equipment expects a transmission of physical downlink control channel (PDCCH) in all downlink subframes (i.e., the relay node needs to support legacy user equipments within a coverage of the relay node to receive PDCCH in each subframe and to perform a measurement function thereof), it is necessary for the PDCCH to be transmitted in all the downlink subframes in order for each legacy user equipment to operate correctly. Therefore, in a subframe configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH is transmitted from the relay node to the user equipment in a control region of the second subframe, it may be able to provide backward compatibility with a legacy user equipment served by the relay node. While no signal is transmitted in the rest region of the $2^{nd}$ subframe from the relay node, the relay node may be able to receive a transmission from the base station. Therefore, the above-mentioned resource partitioning scheme can prevent the access downlink transmission and the backhaul downlink reception from being simultaneously performed by the in-band relay node.

The second subframe, which uses the MBSFN subframe, shall be described in detail as follows. First of all, a control region of the second subframe may be referred to as a relay node non-hearing interval. In particular, the relay node non-hearing interval may mean the interval in which a relay node transmits an access downlink signal instead of receiving a backhaul downlink signal. As mentioned in the foregoing description, this relay node non-hearing interval may be configured to have 1-, 2- or 3-OFDM length. In the relay node non-hearing interval, a relay node performs an access downlink transmission to a user equipment and may receive a backhaul downlink from a base station in the rest of the relay node non-hearing interval. In doing so, since the relay node is unable to perform both transmission and reception on the same frequency band, it may take a time to enable the relay node to be switched from a transmitting mode to a receiving mode. Hence, it may be necessary to configure a guard time (GT) to enable the relay node to perform a transmitting/receiving mode switching in first partial interval of a backhaul downlink receiving region. Similarly, even if the relay node operates in a manner of receiving a backhaul downlink from the base station and transmitting and access downlink to the user equipment, it may be able to configure a guard time (GT) for the transmitting/receiving mode switching of the relay node. The length of the guard time may be defined as a value in time domain. For example, the length of the GT may be defined as k time samples (Ts) (where, k>1) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not configured. In order to maintain backward compatibility, this guard time may be defined only in a frequency domain configured for a backhaul downlink subframe transmission (i.e., a legacy user equipment is not supportable if a guard time is configured in an access downlink interval). In the backhaul downlink receiving interval except the guard time, the relay node may be able to receive relay node dedicated PDCCH and PDSCH from the base station. In the meaning of a relay node dedicated physical channel, the PDCCH and the PDSCH may also be represented as Relay-PDCCH (R-PDCCH) and R-PDSCH (Relay-PDSCH), respectively. And, a user equipment in the course of a communication with a relay node may be represented as R-UE.

According to the present invention, a subframe corresponding to a backhaul link between a base station and a relay node shall be named a backhaul subframe or a Un subframe. And, a subframe corresponding to an access link between a relay node and a user equipment shall be named one of an access subframe, a Un subframe and the like. Yet such subframes may be non-limited by such names.

A macro cell is able to inform a relay node of 8-bit bitmap information, which indicates a configuration of a subframe of a backhaul downlink between the macro cell and a relay node (i.e., Un DL subframe configuration), by RRC layer signaling. Yet, DL subframe indexes 8, 4, 5 and 9 in FDD system or DL subframe indexes 0, 1, 5 and 6 in TDD system are the subframes designated for an access link between a relay node and a user equipment (R-UE) communicating with the relay node, and more particularly, for a communication via Uu interface and are not usable as DL subframes for a backhaul link between the macro cell and the relay node, i.e., DL subframes for Un interface.

Meanwhile, as a specific subframe is set as a backhaul UL subframe in LTE-A system, if a UL transmission occurs, an access UL subframe in the specific subframe may be blocked. Although it is not impossible for R-UE to perform a UL transmission to a relay node in the blocked access UL subframe, the UL transmission is performed while the R-UE is not aware of a presence or non-presence of an occurrence of collision between an access link and a backhaul link. Hence, since reception performance degradation due to the collision is caused to the relay node, it causes a problem of difficulty in decoding a received signal. In case that the R-UE has to perform ACK/NACK transmission to the relay node in the specific subframe, failure or error in receiving the ACK/NACK signal occurs to cause a problem to transceiving operations between the R-UE and the relay node. In order to solve this problem, the present invention proposes a method for an R-UE to perform ACK/NACK transmission using the following scheme. Although the present invention is described in aspect of operations of an access link for clarity and convenience of the following description, it is apparent that the same description should be exactly applicable to operations of a backhaul link.

<$1^{st}$ Embodiment>

First of all, in case that an uplink (UL) ACK.NACK transmission occurs in the blocked subframe, the present invention proposes to apply an ACK/NACK repetition scheme. In particular, even if at least one subframe in an access link includes a blocked subframe, ACK/NACK can be transmitted in another non-blocked subframe within an ACK/NACK repetition interval. Informations on an ACK/NACK repetition factor, a blocked subframe and a non-blocked subframe may be delivered to an R-UE (or a relay node) via an upper layer signal or a specific channel of a physical layer.

Figure 9:
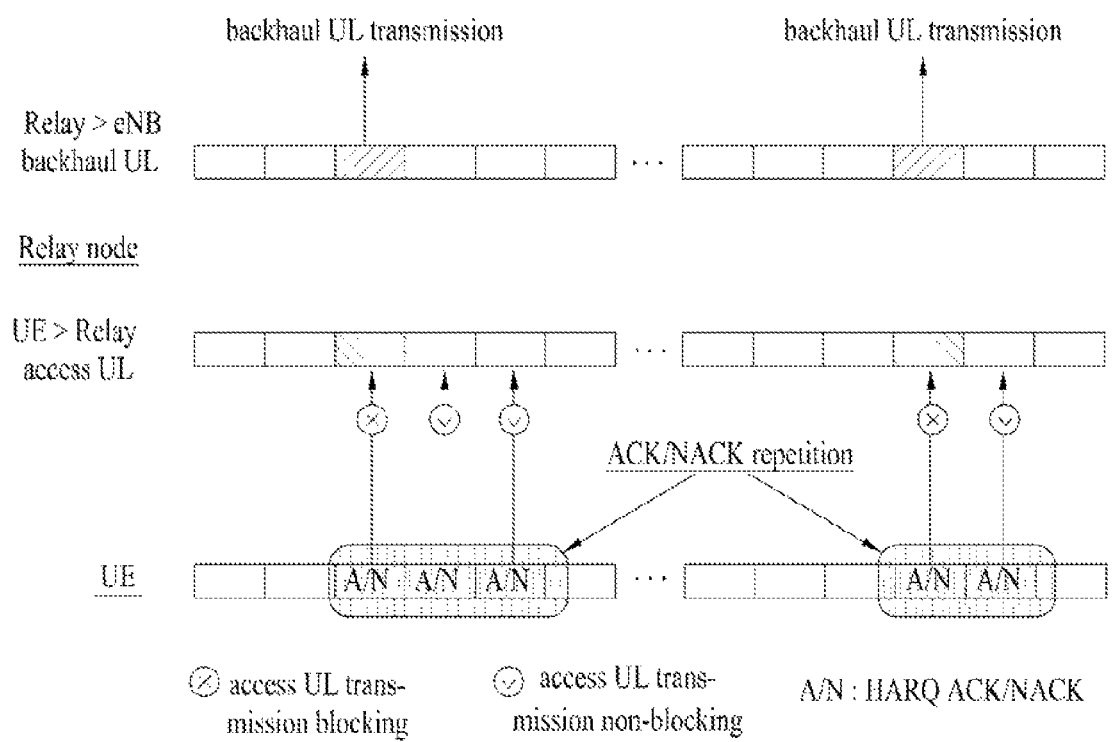
FIG. 9 is a diagram for one example of ACK/NACK transmission scheme according to a $1^{st}$ embodiment of the present invention.

FIG. 9 is a diagram for one example of ACK/NACK transmission scheme according to a $1^{st}$ embodiment of the present invention. Particularly, FIG. 9 assumes a case that a repetition factor for a $1^{st}$ ACK/NACK transmission is set to 3 and that a repetition factor for a $2^{nd}$ ACK/NACK transmission is set to 2.

Referring to FIG. 9, in case that a specific frame includes a blocked subframe, an R-UE repeatedly transmits ACK/NACK in a non-blocked subframe available in accordance with the set repetition factor to a relay node. In doing so, it is preferable that the ACK/NACK transmission is not performed in the blocked subframe in consideration of interference on another user equipment or relay node. And, counting of the ACK/NACK transmission is performed in a manner of including the blocked frame.

Figure 10:
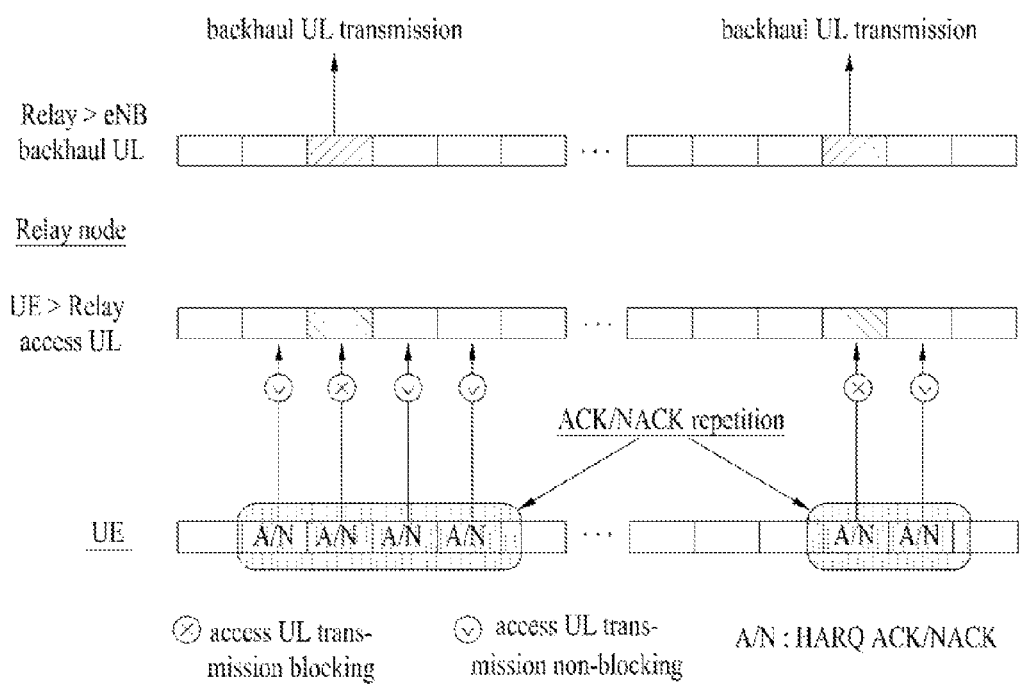
FIG. 10 is a diagram for another example of ACK/NACK transmission scheme according to a $1^{st}$ embodiment of the present invention.

FIG. 10 is a diagram for another example of ACK/NACK transmission scheme according to a $1^{st}$ embodiment of the present invention. Particularly, FIG. 10 assumes a case that a repetition factor for a $1^{st}$ ACK/NACK transmission is set to 4 and that a repetition factor for a $2^{nd}$ ACK/NACK transmission is set to 2.

FIG. 10 shows one example that a start point of the ACK/NACK repetition scheme is possible in a non-blocked subframe previous by one subframe to a blocked subframe instead of the blocked subframe, whereas FIG. 9 shows one example that the ACK/NACK repetition scheme starts with reference to the ACK/NACK in the blocked frame.

Figure 11:
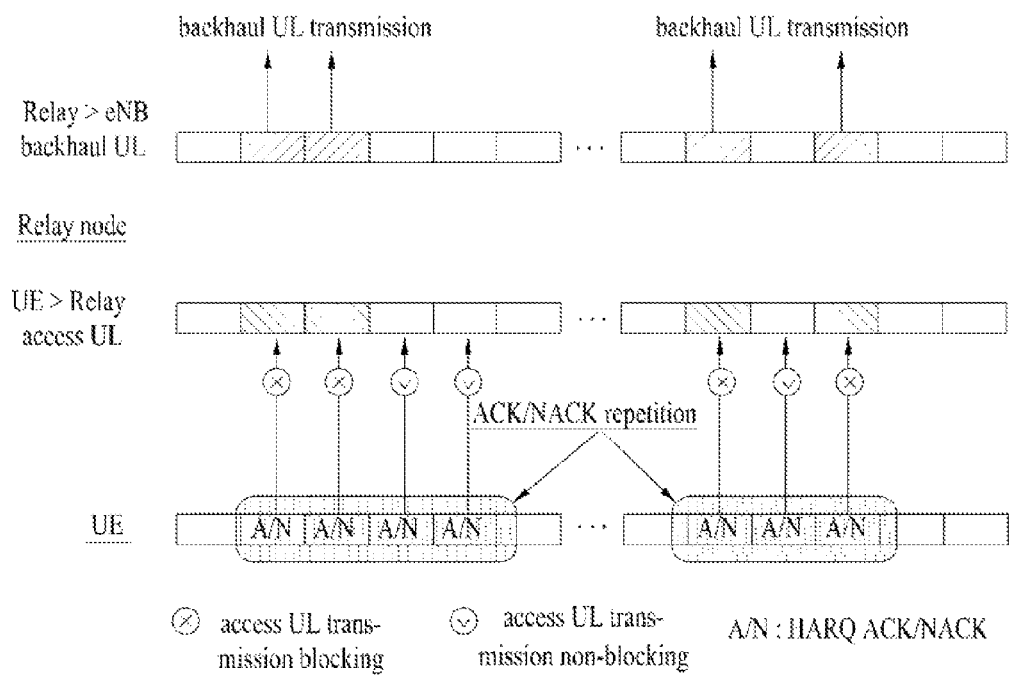
FIG. 11 is a diagram for a further example of ACK/NACK transmission scheme according to a $1^{st}$ embodiment of the present invention.

FIG. 11 is a diagram for a further example of ACK/NACK transmission scheme according to a $1^{st}$ embodiment of the present invention. Particularly, FIG. 9 assumes a case that a repetition factor for a $1^{st}$ ACK/NACK transmission is set to 4 and that a repetition factor for a $2^{nd}$ ACK/NACK transmission is set to 3.

Referring to FIG. 11, although ACK/NACK signal is transmitted in a $1^{st}$ ACK/NACK transmission in a manner of being repeated 4 times, $1^{st}$ and $2^{nd}$ subframes among the subframes included in the repetition interval are blocked subframes. Moreover, although ACK/NACK signal is transmitted in a $2^{nd}$ ACK/NACK transmission in a manner of being repeated 3 times, $1^{st}$ and $3^{rd}$ subframes among the subframes included in the repetition interval are blocked subframes. Likewise, in doing so, it is preferable that the ACK/NACK transmission is not performed in the blocked subframe in consideration of interference on another user equipment or relay node. And, counting of the ACK/NACK transmission is performed in a manner of including the blocked frame.

<$2^{nd}$ Embodiment>

According to a $2^{nd}$ embodiment of the present invention, on the assumption that an R-UE or a relay node recognizes the information related to the blocked subframe, ACK/NACK signal is transmitted in a non-blocked subframe behind the blocked subframe. For instance, instead of transmitting ACK/NACK signal repeatedly, the ACK/NACK signal is not transmitted in a blocked subframe but may be transmitted in a subframe shifted or delayed by N subframe(s). In this case, the N may be set to a negative number as well as to a positive number. If the N is set to the negative number, it means that the ACK/NACK signal is transmitted in a non-blocked subframe prior to a blocked subframe. The relay node is able to inform the R-UE of the N by upper layer signaling or physical layer signaling. If the N is set to 0, each of the R-UE and the relay node does not transmit ACK/NACK in a corresponding blocked subframe but is able to transmit ACK/NACK in a next non-blocked subframe closest to the corresponding blocked subframe.

Meanwhile, ACK/NACK signal supposed to be transmitted in a shifted or delayed subframe may be able to configure one signal in a manner of aggregated or combined with the shifted or delayed ACK/NACK signal. In doing so, the aggregation or combination may be performed by one of ACK/NACK bundling, ACK/NACK multiplexing and the like or may use PUCCH format (e.g., PUCCH format 3, etc.) proposed by LTE-A.

Figure 12:
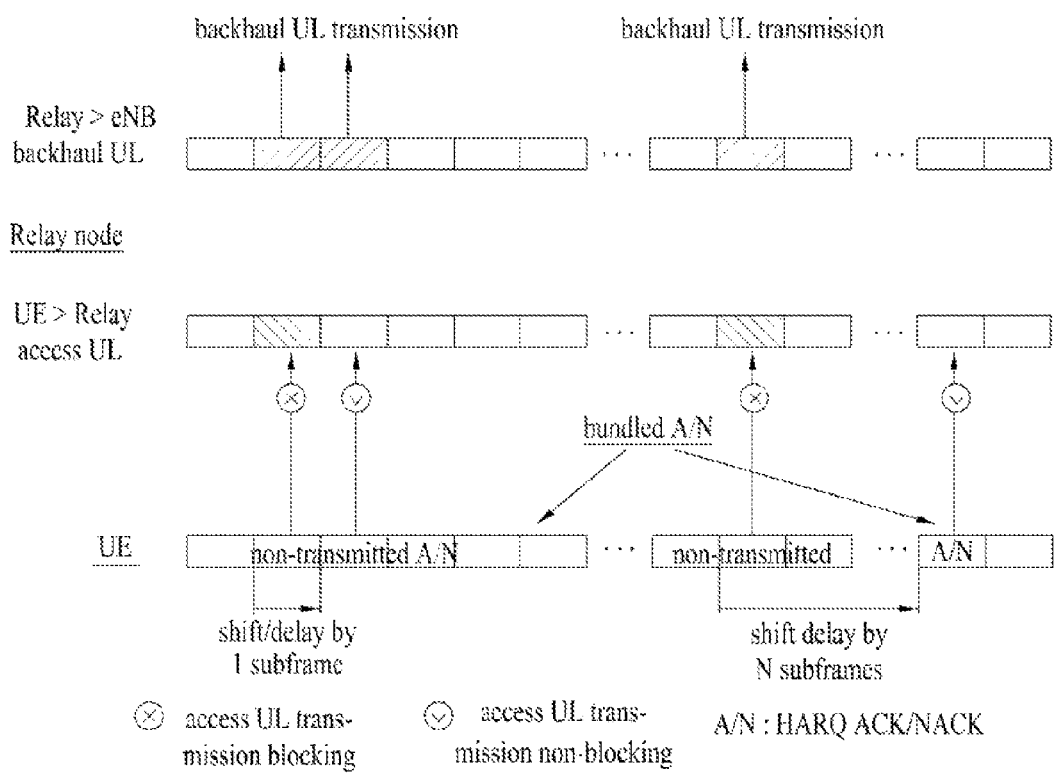
FIG. 12 is a diagram for one example of ACK/NACK transmission scheme according to a $2^{nd}$ embodiment of the present invention.

FIG. 12 is a diagram for one example of ACK/NACK transmission scheme according to a $2^{nd}$ embodiment of the present invention.

Referring to FIG. 12, a $1^{st}$ ACK/NACK transmission may be performed in a manner of being delayed by 1 subframe and a $2^{nd}$ ACK/NACK transmission may be performed in a manner of being delayed by N subframe(s). In doing so, ACK/NACK signal supposed to be transmitted in the delayed subframe may be transmitted in a manner of being configured with a delayed ACK/NACK signal into one signal using one of ACK/NACK bundling, ACK/NACK multiplexing, PUCCH format (e.g., PUCCH format 3) proposed by LTE-A and the like.

The above-described $1^{st}$ embodiment relates to an ACK/NACK repetition scheme as a method of solving the uplink ACK/NACK collision problem that may occur due to a blocked subframe between a backhaul link and an access link. Yet, when a repetition factor is set in a UL subframe corresponding to a UL ACK/NACK transmission timing point using the ACK/NACK repetition scheme, it may be inefficient to apply the same factor value to all UL subframes. In particular, if ACK/NACK repetition factor set with reference to a backhaul UL subframe, in which UL ACK/NACK collision occurs, is identically applied to a UL subframe free from the UL ACK/NACK collision, it may cause an unnecessary ACK/NACK repetition operation of R-UE (or RN).

Therefore, the present invention may propose the two kinds of methods in the following as a method of setting a different ACK/NACK repetition factor depending on a presence or non-presence of UL ACK/NACK collision in each UL subframe corresponding to a UL ACK/NACK transmission timing point. Meanwhile, informations on an ACK/NACK repetition factor, a blocked subframe and a non-blocked subframe may be delivered to an R-UE (or a relay node) via an upper layer signal or a specific channel of a physical layer. Likewise, although the following description is mentioned in aspect of operations of an access link for clarity and convenience, it is apparent that the same description should be exactly applicable to operations of a backhaul link.

<$3^{rd}$ Embodiment>

First of all, according to a $3^{rd}$ embodiment of the present invention, an ACK/NACK repletion factor is set different. And, the $3^{rd}$ embodiment of the present invention relates to a method of operating with an ACK/NACK repetition factor different in accordance with a blocked subframe or a non-blocked subframe, which belongs to a type of a UL subframe corresponding to a UL ACK/NACK transmission timing point. According to a method of counting the number of ACK/NACK repetitions, each time a UL subframe appears irrespective of a blocked subframe or a non-blocked subframe, it is regarded as 1 repetition. And, the corresponding counting starts from a UL subframe corresponding to a current UL ACK/NACK transmission timing point.

For instance, assuming that an ACK/NACK repetition factor set according to the $3^{rd}$ embodiment is $P_1$ and that 'a' blocked subframes and 'b' non-blocked subframes are included in a counting range of the value of the ACK/NACK repetition factor $P_1$ (i.e., $P_1$=a+b), UL ACK/NACK transmission actually occurs total 'b' times in non-blocked subframes only. On the other hand, ACK/NACK transmission is not actually performed in the 'a' blocked subframes in which the number of the ACK/NACK repetitions is counted only.

Meanwhile, the ACK/NACK repetition factor $P_1$ in a non-blocked subframe is set to a preset value (e.g., 0, 1, a negative value, etc.). In this case, it means that the ACK/NACK repetition scheme is not performed. Moreover, the ACK/NACK repetition factor P1 of a blocked subframe may be set to a value other than the preset value. Based on this value, the ACK/NACK repetition scheme is performed. A method of setting ACK/NACK repetition factors P1 of blocked and non-blocked subframes may be defined in various ways other than the above-mentioned method. Moreover, in case that at least two blocked subframes exist in a single frame (e.g., 10 ms), a different repetition factor may be set for each of the at least two blocked subframes.

Figure 13:
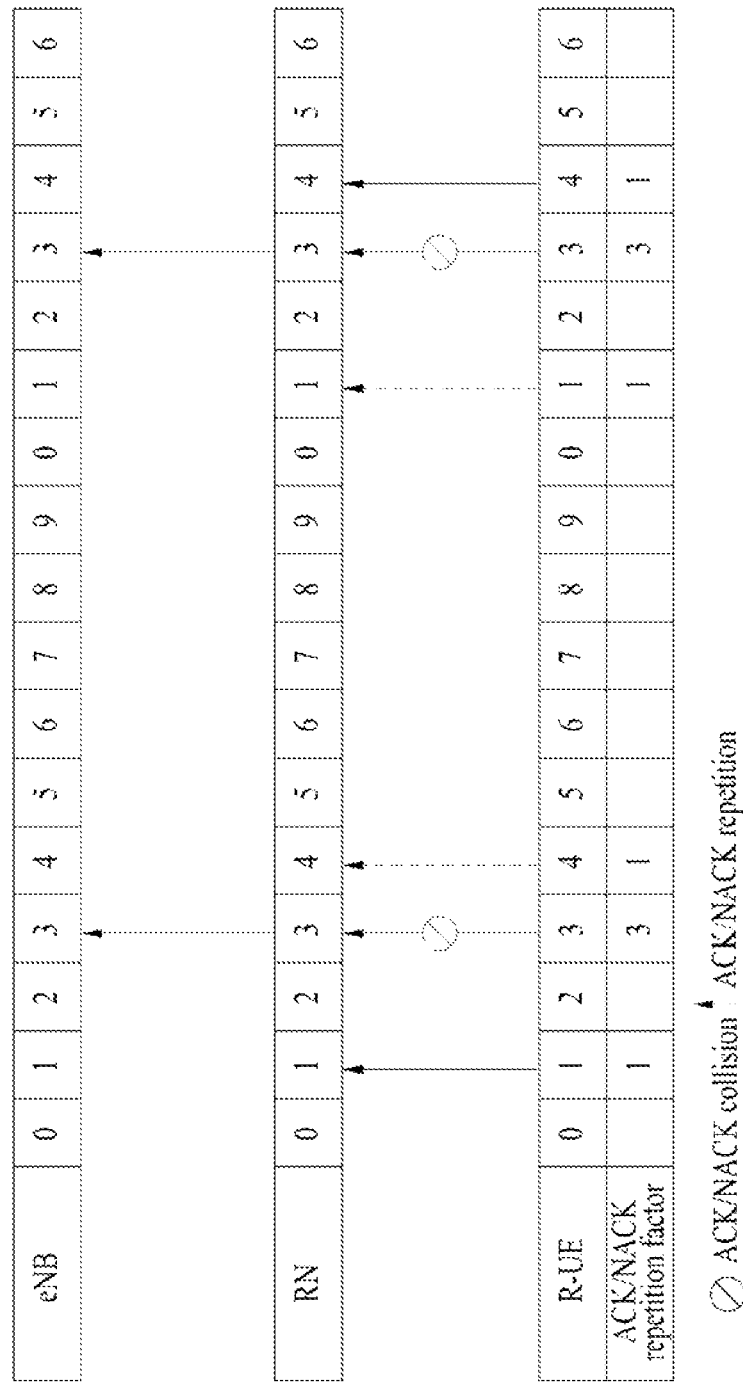
FIG. 13 is a diagram for one example of performing ACK/NACK repetition scheme according to a $3^{rd}$ embodiment of the present invention.

FIG. 13 is a diagram for one example of performing ACK/NACK repetition scheme according to a $3^{rd}$ embodiment of the present invention. Particularly, in case that a UL ACK/NACK transmission is requested in an access UL subframe #3 having an ACK/NACK repetition factor set to 3, FIG. 13 shows one example that an ACK/NACK repetition scheme is performed according to the $3^{rd}$ embodiment.

Referring to FIG. 13, if the $3^{rd}$ embodiment of the present invention is applied, an ACK/NACK transmission is not actually performed in a subframe #3 corresponding to a blocked subframe but the number of ACK/NACK repetitions is counted only. Hence, the ACK/NACK transmission of the access UL subframe #3 is actually performed two times in an access UL subframe #4 and an access UL subframe #1 of a next frame. Moreover, in FIG. 13, an ACK/NACK repetition factor P1 in the ACK/NACK repetition performed non-blocked subframe is represented as 0.

Figure 14:
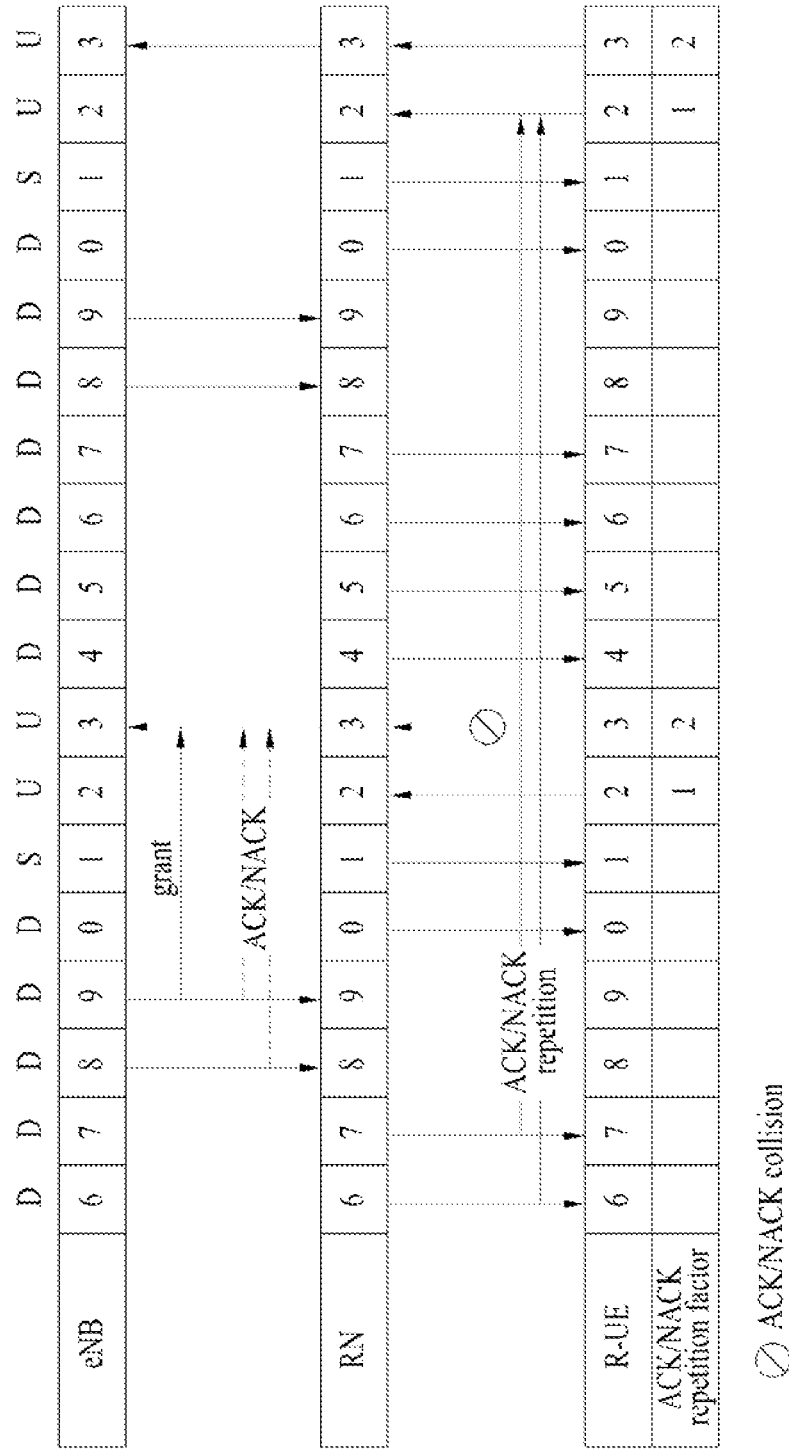
FIG. 14 is a diagram for another example of performing ACK/NACK repetition scheme according to a $3^{rd}$ embodiment of the present invention.

FIG. 14 is a diagram for another example of performing ACK/NACK repetition scheme according to a $3^{rd}$ embodiment of the present invention. Particularly, FIG. 14 shows one example that an ACK/NACK repetition scheme is performed in a TDD system according to the $3^{rd}$ embodiment. In this case, Un link and Uu link assume the UL-DL configuration #4. And, assume a case that UL ACK/NACK collision occurs in a UL subframe #3. For reference, according to TDD UL-DL configuration #4, ACK/NACKs for the subframes #0, #1, #4 and #5 are transmitted in the subframe #2 and ACK/NACKs for the subframes #6, #7, #8 and #9 are transmitted in the subframe #3.

Referring to FIG. 14, in case that an R-UE receives data in access DL subframes #6 and #7 from an RN, the R-UE should transmit ACK/NACK in an access UL subframe #3 of a next frame. Yet, since the ACK/NACK repetition factor of the subframe #3 is set to 2, the ACK/NACK transmission is actually performed in an access UL subframe #2 by the counting method according to the $3^{rd}$ embodiment. In particular, in the subframe #3 corresponding to a blocked subframe, ACK/NACK transmission is not actually performed but the number of ACK/NACK repetitions is counted only.

On the other hand, in case that the R-UE receives data from the RN in the access DL subframes #0, #1, #4 and #5, it is possible to perform UL ACK/NACK transmission in an access UL subframe #2 of a next frame in accordance with TDD UL-DL configuration #4.

Figure 15:
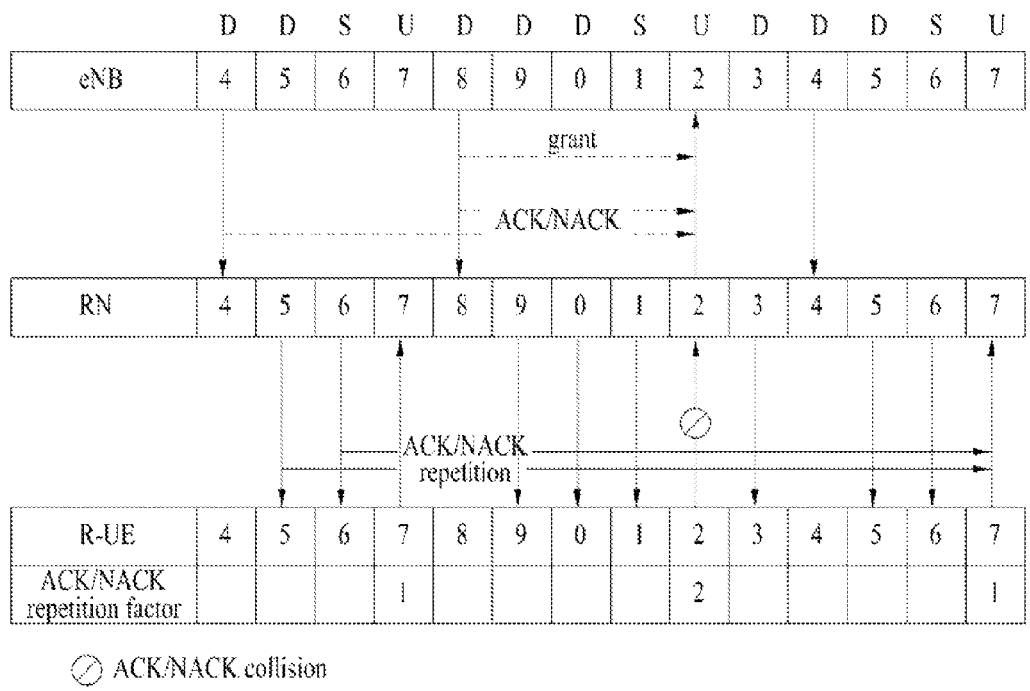
FIG. 15 is a diagram for another example of performing ACK/NACK repetition scheme according to a $3^{rd}$ embodiment of the present invention.

FIG. 15 is a diagram for another example of performing ACK/NACK repetition scheme according to a $3^{rd}$ embodiment of the present invention. Particularly, FIG. 15 assumes a case that UL ACK/NACK collision occurs in UL subframe #2 in case of TDD UL-DL configuration #2.

Referring to FIG. 15, in case that an R-UE receives data from an RN in access DL subframes #5 and #6, the RN should transmit ACK/NACK in an access UL subframe e#2 of a next frame in accordance with TDD UL-DL configuration #2. Yet, since the ACK/NACK repetition factor of the access UL subframe #2 is set to 2, the ACK/NACK transmission is performed in an access UL subframe #7 by the counting method according to the $3^{rd}$ embodiment. In particular, in the subframe #2 corresponding to a blocked subframe, ACK/NACK transmission is not actually performed but the number of ACK/NACK repetitions is counted only.

On the other hand, in case that the R-UE receives data in the access DL subframes #0, #1, #3 and #9, it is possible to perform ACK/NACK transmission in an access UL subframe #7 of a next frame in accordance with TDD UL-DL configuration #2.

<4$^{th}$ Embodiment>

According to a $4^{th}$ embodiment of the present invention, an ACK/NACK repetition factor is set different. Unlike the $3^{rd}$ embodiment, according to the $4^{th}$ embodiment, counting is performed only if an ACK/NACK transmission is actually performed in a non-blocked subframe except a blocked subframe. Alternatively, counting is performed each time a non-blocked subframe appears except a blocked subframe. Yet, an ACK/NACK repetition factor $P_2$ of a non-blocked subframe may be set to a preset value (e.g., 0, 1, negative value, etc.) like the $3^{rd}$ embodiment and is set to 0 in the following drawing. Since a UL subframe corresponding to a current UL ACK/NACK transmission timing point is a non-blocked subframe, it is able to directly perform a UL ACK/NACK transmission in the corresponding subframe. In this case, the ACK/NACK repetition scheme may be construed as not operating.

Yet, according to the $4^{th}$ embodiment of the present invention, a method of disabling an ACK/NACK repetition scheme by designating an ACK/NACK repetition factor $P_2$ of a non-blocked subframe to a value other than a preset value is not excluded. Moreover, in case that at least 2 blocked subframes exist in a single frame (e.g., 10 ms), a different repetition factor may be set for each of the at least two blocked subframes.

Figure 16:
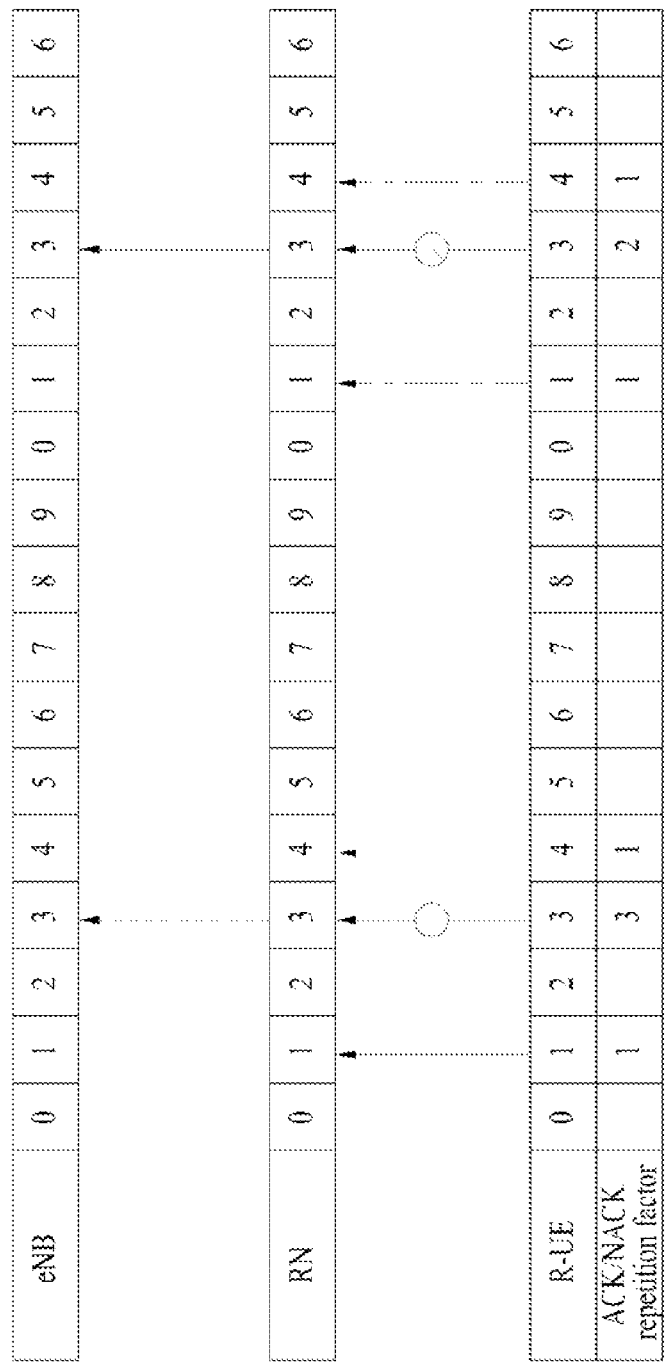
FIG. 16 is a diagram for one example of performing ACK/NACK repetition scheme according to a $4^{th}$ embodiment of the present invention.

FIG. 16 is a diagram for one example of performing ACK/NACK repetition scheme according to a $4^{th}$ embodiment of the present invention. Particularly, FIG. 13 assumes a case that a UL ACK/NACK transmission is requested in an access UL Subframe #3 having an ACK/NACK repetition factor set to 3 like FIG. 13.

Referring to FIG. 16, since counting is performed only if an ACK/NACK transmission is actually performed in a non-blocked subframe except a blocked subframe only according to a $4^{th}$ embodiment, a UL ACK/NACK transmission is actually performed total 3 times in access UL subframes $1, #1 and #4 actually for the access UL subframe #3 having the ACK/NACK repetition factor set to 3. In this case, the access UL subframe #4 having the same subframe index means a subframe of a different timing point actually having a time difference of 10 ms. If it is desired to obtain the same result of the case of applying the $1^{st}$ embodiment from the $4^{th}$ embodiment, the ACK/NACK repetition factor of the access UL subframe #3 is just modified into 2 from 3.

Figure 17:
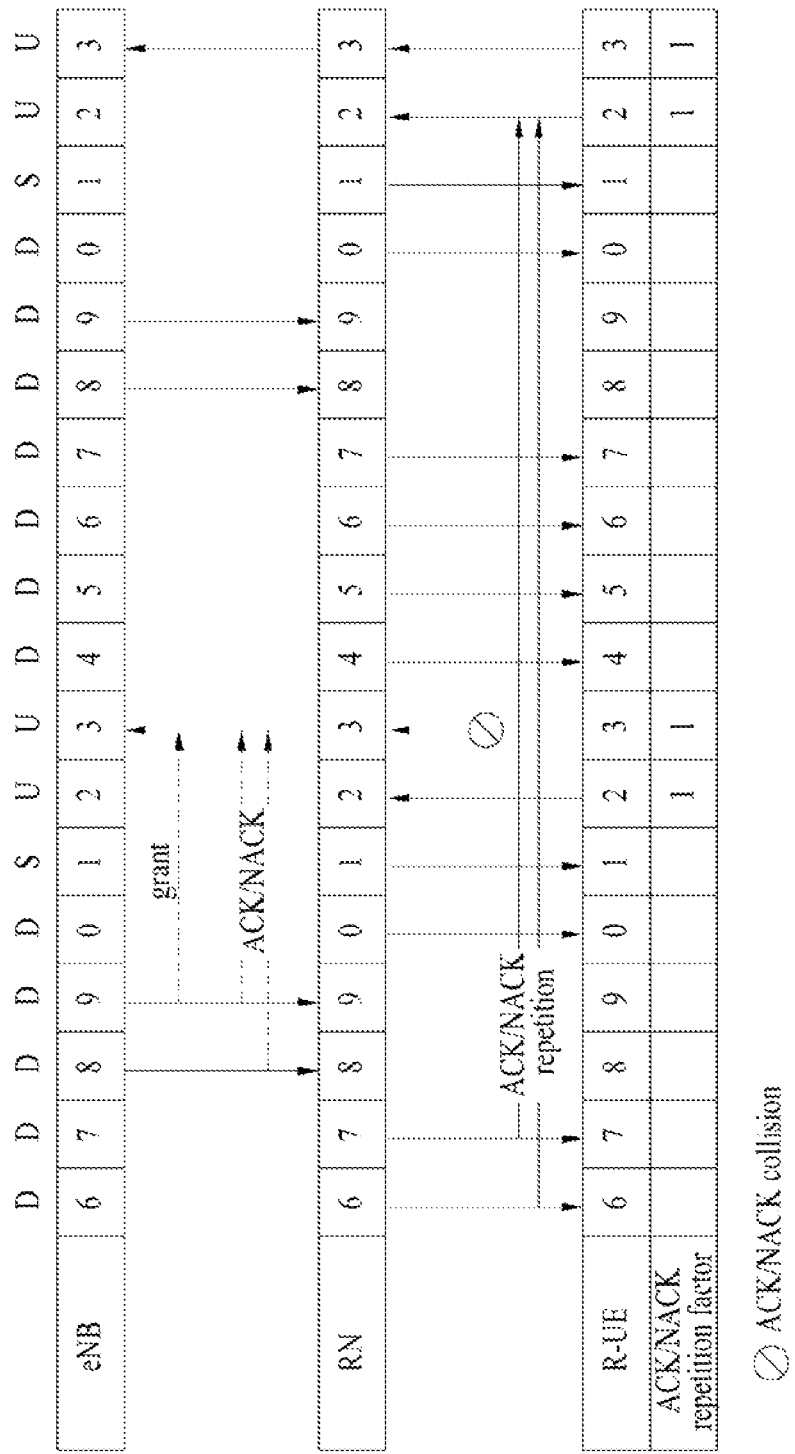
FIG. 17 is a diagram for another example of performing ACK/NACK repetition scheme according to a $4^{th}$ embodiment of the present invention.

FIG. 17 is a diagram for another example of performing ACK/NACK repetition scheme according to a $4^{th}$ embodiment of the present invention. Particularly, FIG. 17 shows one example of performing the ACK/NACK repetition scheme according to the $4^{th}$ embodiment in the TDD system shown in FIG. 14.

In FIG. 17, in order to derive the same result of FIG. 14, an ACK/NACK repetition factor is adjusted. In particular, referring to FIG. 17, the ACK/NACK repetition factor is adjusted into 1 from 2 in an access UL subframe #3.

Figure 18:
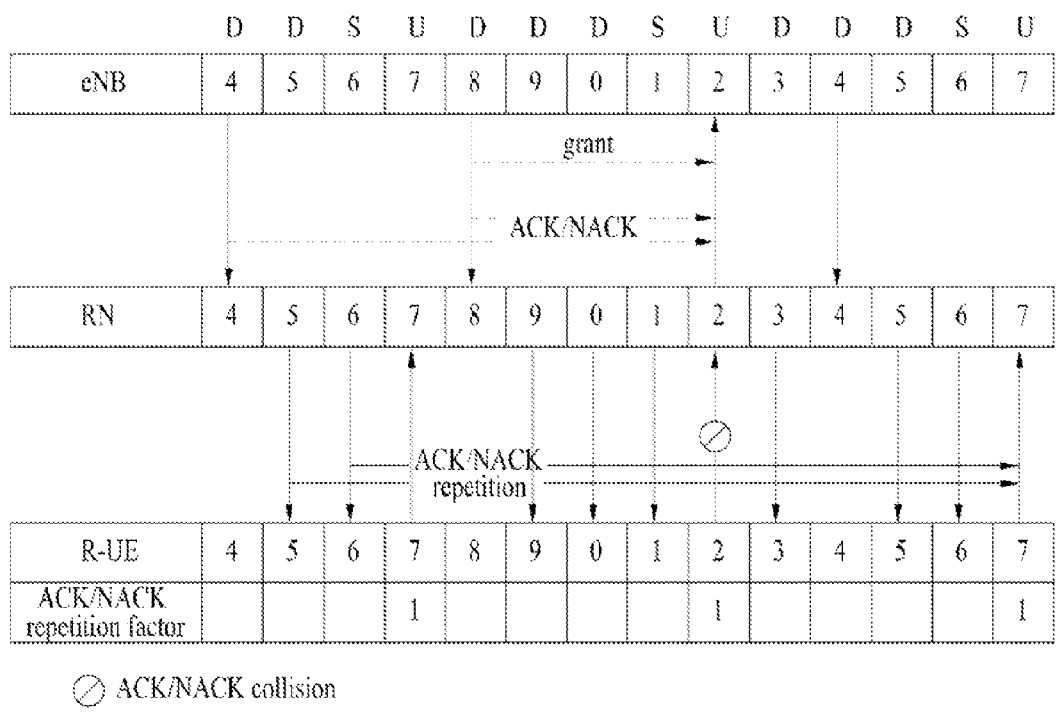
FIG. 18 is a diagram for a further example of performing ACK/NACK repetition scheme according to a $4^{th}$ embodiment of the present invention.

FIG. 18 is a diagram for a further example of performing ACK/NACK repetition scheme according to a $4^{th}$ embodiment of the present invention. Particularly, FIG. 18 shows one example of performing the ACK/NACK repetition scheme according to the $4^{th}$ embodiment in the TDD system shown in FIG. 15.

In FIG. 18, in order to derive the same result of FIG. 15, an ACK/NACK repetition factor is adjusted. In particular, referring to FIG. 17, the ACK/NACK repetition factor is adjusted into 1 from 2 in an access UL subframe #2.

According to the 3$^{rd}$ and 4$^{th}$ embodiments mentioned in the above description, ACK/NACK repetition factor is set different depending on a presence or non-presence of UL ACK/NACK collision in each UL subframe corresponding to a UL ACK/NACK transmission timing point. By this method, it is able to avoid the unnecessary UL ACK/NACK repetition transmission in a non-blocked subframe.

Figure 19:
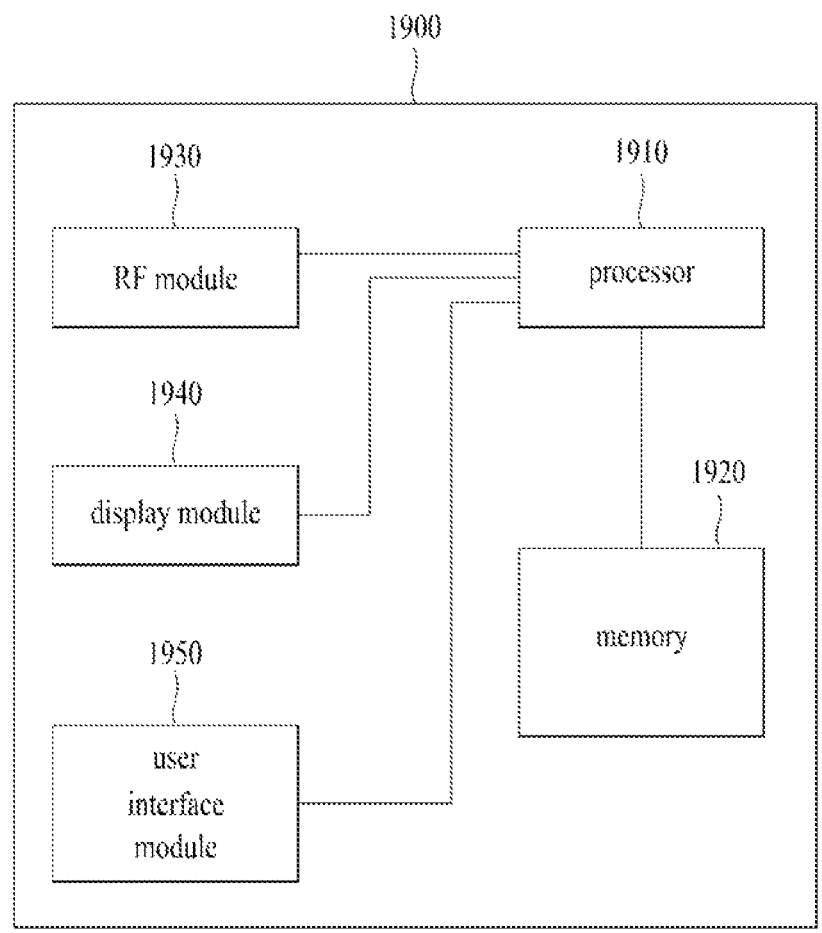
FIG. 19 is a block diagram for one example of a communication device according to one embodiment of the present invention.

FIG. 19 is a block diagram for one example of a communication device according to one embodiment of the present invention.

Referring to FIG. 19, a communication device 1900 includes a processor 1910, a memory 1920, an RF module 1930, a display module 1940 and a user interface module 1950.

The communication device 1900 is illustrated for clarity and convenience of the description and some modules can be omitted. Moreover, the communication device 1900 is able to further include at least one necessary module. And, some modules of the communication device 1900 can be further divided into sub-modules. The processor 1910 is configured to perform operations according to the embodiment of the present invention exemplarily described with reference to the accompanying drawings. In particular, the detailed operations of the processor 1910 can refer to the contents described with reference to FIGS. 1 to 18.

The memory 1920 is connected to the processor 1910 and stores an operating system, applications, program codes, data and the like. The RF module 1930 is connected to the processor 1910 and performs a function of converting a baseband signal to a radio signal or converting a radio signal to a baseband signal. For this, the RF module 1930 performs analog conversion, amplification, filtering and frequency uplink transform or inverse processes thereof. The display module 1940 is connected to the processor 1910 and displays various kinds of informations. The display module 1940 can include such a well-known element as LCD (Liquid Crystal Display), LED (Light Emitting Diode), OLED (Organic Light Emitting Diode) and the like, by which the present invention is non-limited. The user interface module 1950 is connected to the processor 1910 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention are described centering on the data transmission/reception relations between a relay node and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method and apparatus for a user equipment to transmit an ACK/NACK signal to a relay node in a wireless communication system are described mainly with reference to examples applied to 3GPP LTE system, as mentioned in the foregoing description, the present invention is applicable to various kinds of wireless communication systems as well as the 3GPP LTE system.

What is claimed is:

1. A method of transmitting an ACK/NACK (acknowledgement/negative-ACK) signal, which is transmitted by a user equipment to a relay node in a wireless communication system, the method comprising:

configuring an uplink subframe pattern including uplink blocked subframes and uplink non-blocked subframes and configuring an ACK/NACK repetition factor per uplink subframe;

receiving first data from the relay node in at least one downlink subframe; and transmitting a first ACK/NACK signal corresponding to the first data repeatedly in accordance with the uplink subframe pattern and the ACK/NACK repetition factor, wherein the ACK/NACK repetition factor is configured differently based on whether a type of an uplink subframe for transmitting the first ACK/NACK signal is a blocked subframe or an un-blocked subframe, wherein, a value of the ACK/NACK repetition factor for the un-blocked subframe is smaller than a value of the ACK/NACK repetition factor for the blocked subframe, and wherein a count number of transmission of the first ACK/NACK signal corresponding to the ACK/NACK repetition factor includes a transmission of the first ACK/NACK signal in a specific one of the uplink blocked subframes.

2. The method of claim 1, wherein transmitting the first ACK/NACK signal comprises:
transmitting the first ACK/NACK signal a specific number of times corresponding to count number corresponding to the ACK/NACK repetition factor.

3. The method of claim 2, wherein, if the first ACK/NACK signal is to be transmitted in either the non-blocked subframe or the blocked subframe after receiving second data, which is next data to the first data, the first ACK/NACK signal and a second ACK/NACK signal corresponding to the second data are both transmitted through the non-blocked subframe or the blocked subframe, with the first ACK/NACK signal being combined with the second ACK/NACK using one of ACK/NACK bundling or ACK/NACK multiplexing.

4. The method of claim 1, wherein the uplink blocked subframe comprises a backhaul uplink subframe configured for a transmission of the first ACK/NACK signal to a base station from the relay node.

5. The method of claim 1, the configuring step comprising the step of receiving information on the uplink subframe pattern and the ACK/NACK repetition factor from the relay node via an upper layer.

6. A user equipment, which is configured to communicate with a relay node in a wireless communication system, the user equipment comprising:
a processor arranged to configure an uplink subframe pattern including uplink blocked subframes and uplink non-blocked subframes and to configure an ACK/NACK repetition factor per uplink subframe; and
a wireless communication module configured to
receive first data from the relay node in at least one downlink subframe, and
transmit a first ACK/NACK signal corresponding to the first data repeatedly in accordance with the uplink subframe pattern and the ACK/NACK repetition factor,
wherein the ACK/NACK repetition factor is configured differently based on whether a type of an uplink subframe for transmitting the first ACK/NACK signal is a blocked subframe or an un-blocked subframe,
wherein, a value of the ACK/NACK repetition factor for the un-blocked subframe is smaller than a value of the ACK/NACK repetition factor for the blocked subframe, and
wherein a count number of transmission of the first ACK/NACK signal corresponding to the ACK/NACK repetition factor includes a transmission of the first ACK/NACK signal in a specific one of the uplink blocked subframes.

7. The user equipment of claim 6, wherein the processor controls the first ACK/NACK signal to be transmitted a specific number of times corresponding to the count number corresponding to the ACK/NACK repetition factor.

8. The user equipment of claim 7, wherein, if the first ACK/NACK signal is to be transmitted in either the non-blocked subframe or the blocked subframe after receiving second data, which is next data to the first data, the first ACK/NACK signal and a second ACK/NACK signal corresponding to the second data are both transmitted through the non-blocked subframe or the blocked subframe, with the first ACK/NACK signal being combined with the second ACK/NACK using one of ACK/NACK bundling or ACK/NACK multiplexing.

9. The user equipment of claim 6, wherein the uplink blocked subframe comprises a backhaul uplink subframe configured for a transmission of the first ACK/NACK signal to a base station from the relay node.

10. The user equipment of claim 6, wherein the wireless communication module receives information on the uplink subframe pattern and the ACK/NACK repetition factor from the relay node via an upper layer signal.

* * * * *